United States Patent
Chung et al.

(10) Patent No.: US 7,225,846 B2
(45) Date of Patent: Jun. 5, 2007

(54) PNEUMATIC TIRE WITH REINFORCED BEAD PART

(75) Inventors: Doh-Zong Chung, Kwangju-shi (KR); Bok-Soo Park, Kwangju-shi (KR); Myung-Jin Lee, Kwangju-shi (KR)

(73) Assignee: Kumho Tire Co., Inc., Seoul (KR)

( * ) Notice: Subject to any disclaimer, the term of this patent is extended or adjusted under 35 U.S.C. 154(b) by 0 days.

(21) Appl. No.: 10/472,603

(22) PCT Filed: Aug. 31, 2001

(86) PCT No.: PCT/KR01/01483

§ 371 (c)(1),
(2), (4) Date: Feb. 27, 2004

(87) PCT Pub. No.: WO02/076767
PCT Pub. Date: Oct. 3, 2002

(65) Prior Publication Data
US 2004/0134583 A1    Jul. 15, 2004

(30) Foreign Application Priority Data
Mar. 20, 2001   (KR) .............................. 2001-14259

(51) Int. Cl.
*B60C 15/00* (2006.01)
*B60C 15/06* (2006.01)
*B60C 9/00* (2006.01)
(52) U.S. Cl. ...................... 152/539; 152/542; 152/546; 152/548; 152/552; 152/554
(58) Field of Classification Search .............. 152/539, 152/542, 543, 548, 552, 554
See application file for complete search history.

(56) References Cited

U.S. PATENT DOCUMENTS

| | | | | | |
|---|---|---|---|---|---|
| 5,879,485 | A | * | 3/1999 | Sakamoto et al. | 152/554 |
| 5,971,047 | A | * | 10/1999 | Drieux et al. | 152/158 |
| 5,971,049 | A | * | 10/1999 | Minami et al. | 152/510 |
| 6,179,028 | B1 | | 1/2001 | Drieux et al. | |
| 6,463,975 | B1 | * | 10/2002 | Auxerre | 152/454 |
| 6,886,617 | B2 | * | 5/2005 | Eynard et al. | 152/544 |

FOREIGN PATENT DOCUMENTS

| | | | |
|---|---|---|---|
| JP | 1-215606 | * | 8/1989 |
| JP | 6-227216 | | 8/1994 |
| JP | 7-17219 | | 1/1995 |
| JP | 2000118209 | * | 4/2000 |

* cited by examiner

*Primary Examiner*—Justin R. Fischer
(74) *Attorney, Agent, or Firm*—D. Peter Hochberg; Sean Mellino

(57) ABSTRACT

The present invention relates to a pneumatic tire with a rubber lump applied to the bead part, and more particularly, to a pneumatic tire wherein the bead part is reinforced by applying a rubber lump on the side surface of the lower portion of the bead with a carcass ply. A flipper, which provides reinforcement, can also be used. The carcass play is spirally wound through the upper, side and lower portion of said rubber lump to an arbitrary point of the upper portion of said bead so that by minimizing the movement of the bead by way of the carcass ply or the flipper, the bead portion of the tire is not easily broken away from the rim when air is evacuated from the tire which is installed on a special rim that does not have a flange, or while driving with a tire with low air pressure.

7 Claims, 4 Drawing Sheets

PNEUMATIC TIRE WITH REINFORCED BEAD PART

CROSS REFERENCE TO RELATED APPLICATION

This application is a national phase application of International Application No. PCT/KR01/01483, filed Aug. 31, 2001, and claims the priority of Korean application number 2001-14259 filed Mar. 20, 2001.

TECHNICAL FIELD

The present invention relates to a pneumatic tire with a rubber lump applied to the bead part, and more particularly, to a pneumatic tire wherein the bead part is reinforced by using a rubber lump, and a carcass ply or a reinforcing structure which encloses the rubber lump, to minimize the movement of the bead so that the bead portion is not easily released from the rim of the tire, especially the tire installed on the rim without a flange, while driving under low air pressure of tire.

BACKGROUND ART

In conventional pneumatic tires, a wedge is installed at the side of the bead so that the bead portion of the tire is not released from the rim when the tire is deflated or at low air pressure. As one example of prior art, U.S. Pat. No. 5,971,047 is illustrated in FIG. 1. As shown in the figure, the upper part of carcass ply 3 winds a wedge 2 and is turned up, and then spherical bead 1 is installed wound on the carcass ply. This art requires many manufacturing steps and has many problems as described below.

First, the process of installing the bead and the wedge is very complicated, and there is a possibility that the bead is released from the rim due to the movement of the spherical bead applied when the tire is deflated. Moreover, since the hardness of the wedge 2 used is low, a shore hardness of about 95 or lower, the wedge 2 can be deformed partially on the portion suppressed by the bead 1, and cannot perform the desired role.

SUMMARY OF THE INVENTION

The object of the present invention is to improve the bead portion of the pneumatic tire installed on the rim, the toe of which is larger than the heel in diameter, while not changing the function of the tire, and to provide a pneumatic tire which can prevent the bead portion from releasing from the rim when the tire is deflated so that car accidents can be prevented.

EXPLANATION OF MARKS IN THE FIGURES

Figure 1:
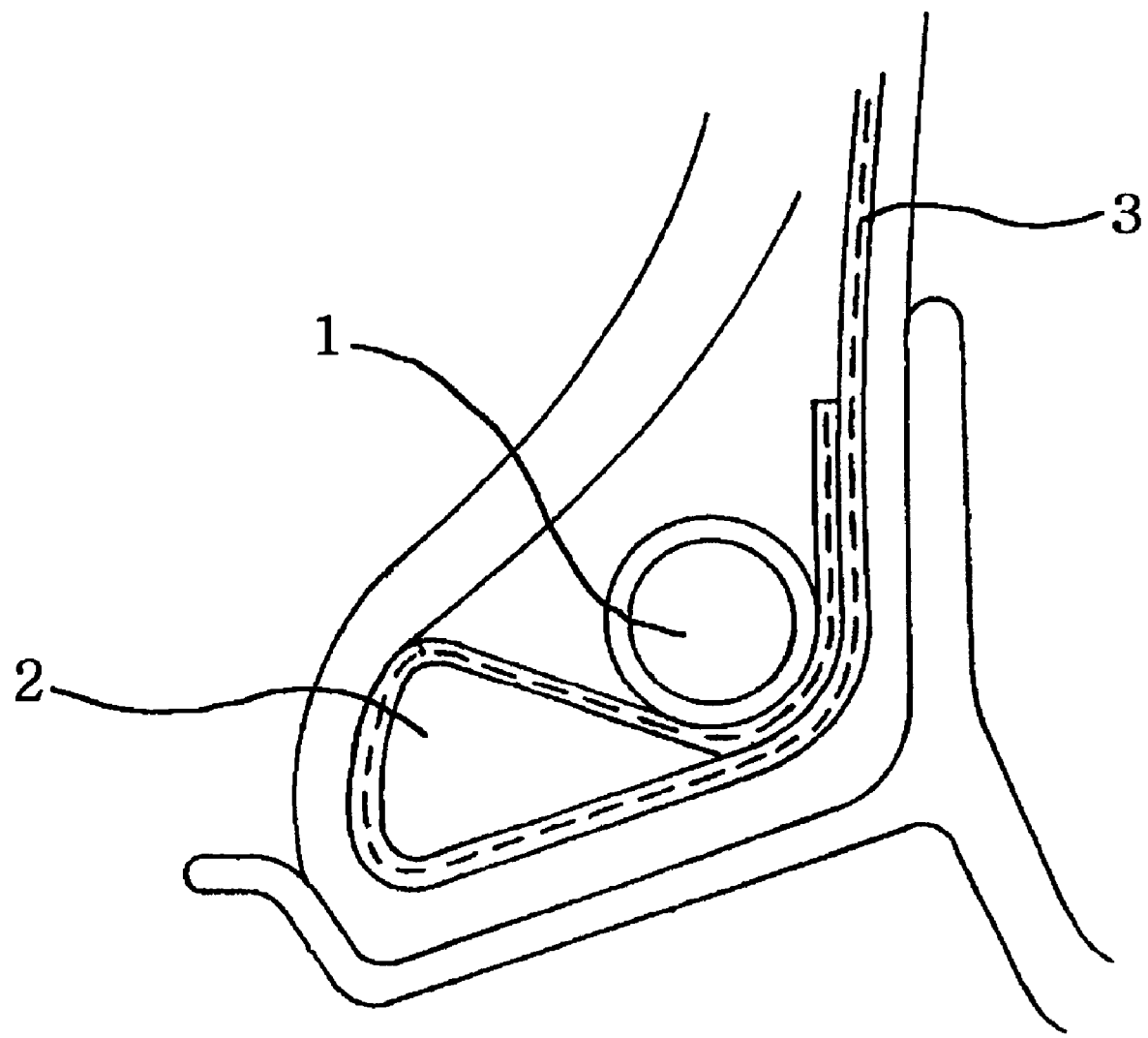
FIG. 1 is a sectional view of the bead portion of a conventional tire.

1: bead.
2: wedge
3: 3, 3a, 3a', 3b, 3b', 3c, 3c', 3d and 3d': carcass ply.
4: flipper.
5: rubber lump.
6: flange.
7: bead sheet.
8: bead portion.

DETAILED DESCRIPTION OF THE INVENTION

To achieve the object as stated above, a rubber lump 5 is installed at the side surface of a bead 1, and a carcass ply 3 winds the rubber lump 5 in the same direction or in various shapes so that the rubber lump 5 and the carcass ply 3 wound thereto prevent the bead 1 from being released from the bead sheet 7 of the rim when the tire is deflated.

The constitution of the pneumatic tire having reinforced bead part 1 of the present invention will be described in detail with reference to the accompanying drawings.

Figure 2:
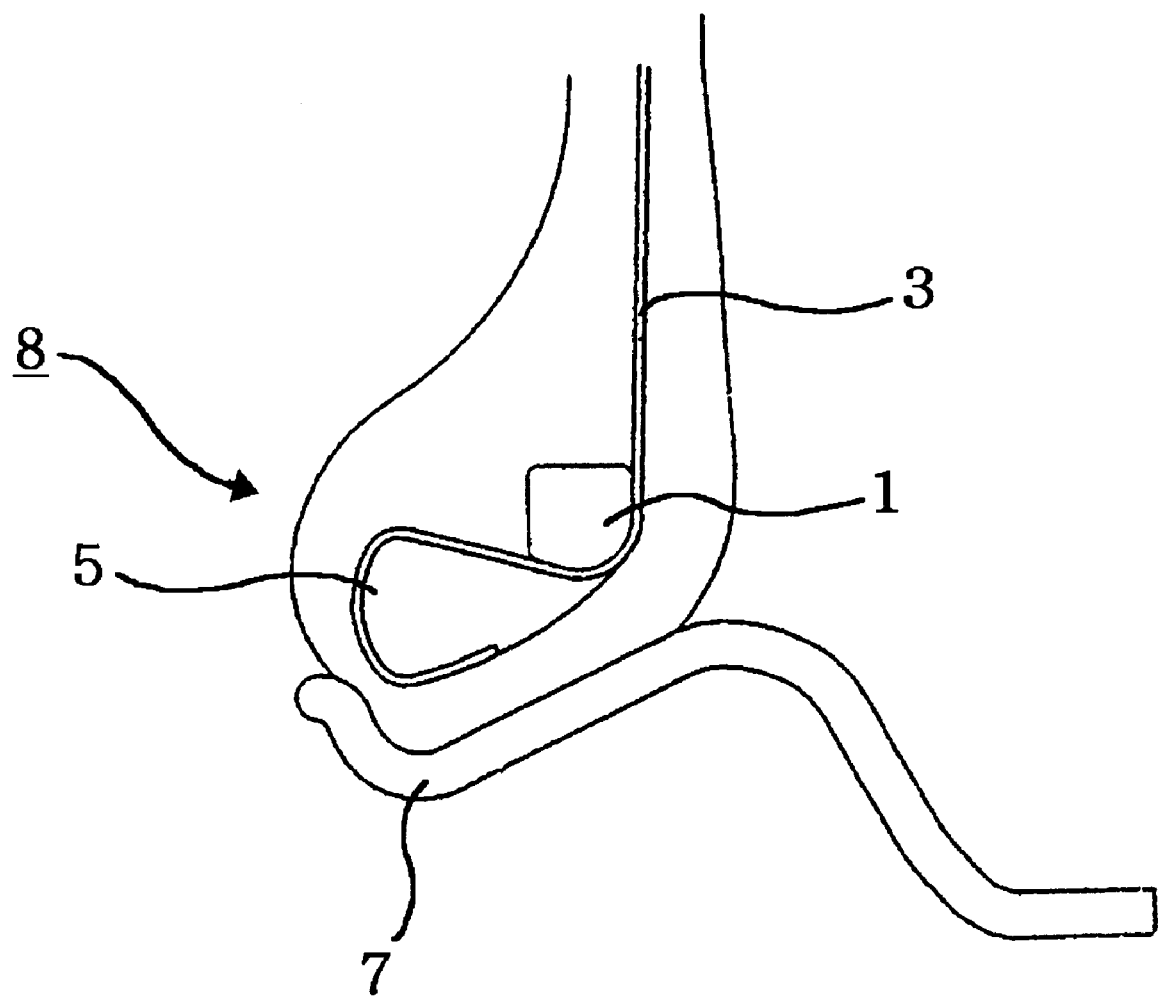
FIG. 2 is a sectional view of the bead portion of a tire according to one embodiment of the present invention.

FIG. 2 is a cross-sectional view of a tire according to one embodiment of the present invention, wherein a wedge-shaped rubber lump 5 having a Shore hardness of 95~100 is installed at the bottom of the bead 1 in a square shape in order to decrease movement of the bead 1 in a bead portion 8 mounted to a bead sheet 7 of the rim, and carcass ply 3 winds from the upper end to the lower end of the bead, and then from the upper surface to the side surface and to the bottom surface of said rubber lump 5. It is much more effective for the carcass ply 3 to wind in the above order than it winds in the order of the bottom surface, the side surface and upper surface.

Now the process of manufacturing the bead part 8 in which the carcass ply 3 winds the rubber lump 5 will be described.

The carcass ply can be manufactured easily in the following manner: the rubber lump 5 winds at an arbitrary point of the molding drum, and one sheet of carcass ply 3 winds thereto, and the rubber lump 5 is turned down at both ends of the carcass ply 3 to wind the bead.

Accordingly, when the tire is deflated or under-inflated while driving, the carcass ply 3 is pulled toward the side of the tire, and this force makes the carcass ply 3 push the bead 1 against the rubber lump 5. Then the rubber lump 5 is pushed to the rim, and the bead 1 does not push rubber lump 5 any more. Therefore, the bead part 8 is not easily released from the rim because the bead part 8 is prevented from being released from the bead sheet 7.

Figure 3:
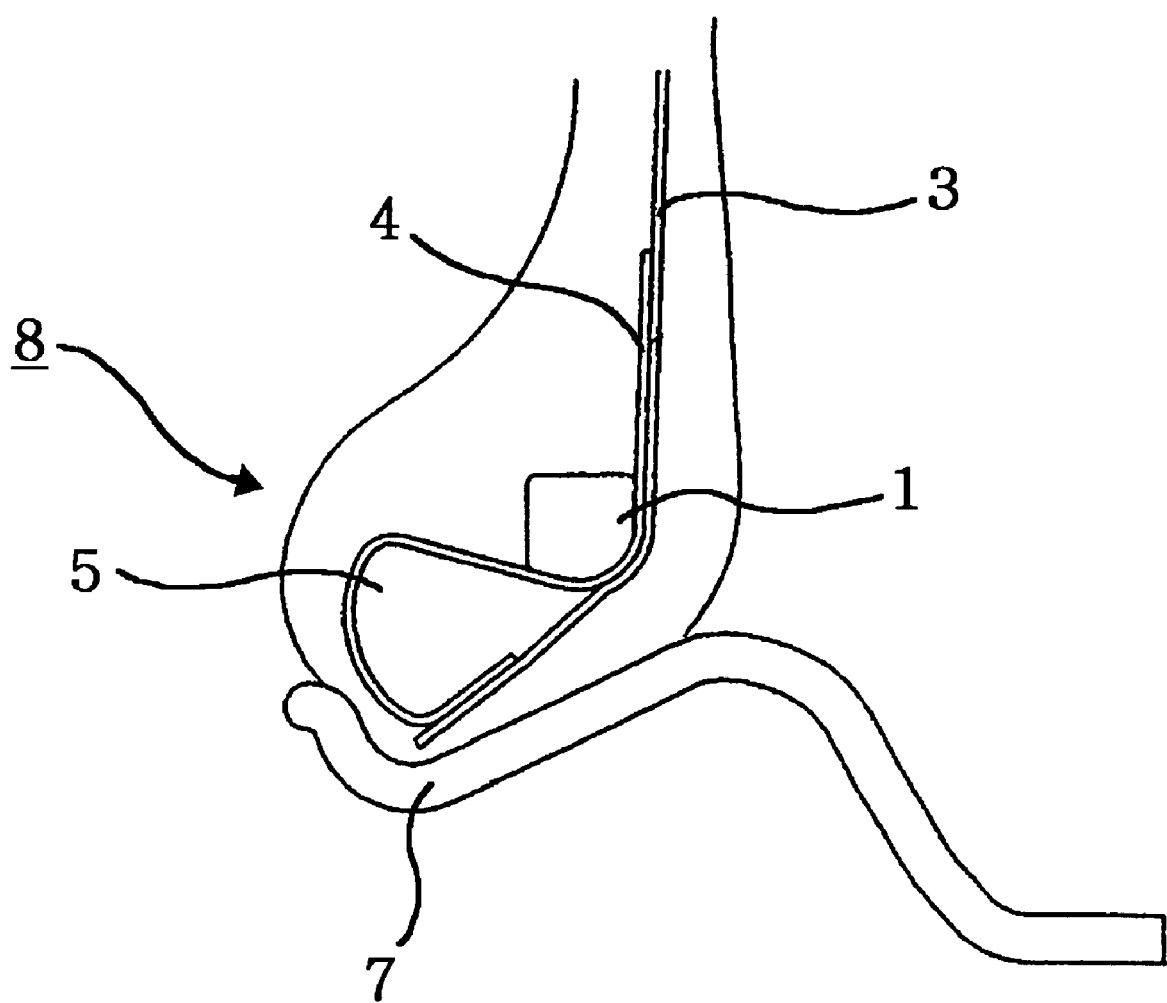
FIG. 3 is a sectional view according to another embodiment of the present invention, which inserts reinforcing structure in the bead portion.

FIG. 3 represents the pneumatic tire in which a flipper 4 is applied as a reinforcing structure. By using the reinforcing structure, the problem of a prior art tire in that the bead part of a tire is moved to the wall area and released from the bead sheet 7 when the tire is deflated or is under-inflated while driving can be overcome. As illustrated in FIG. 3, the flipper 4 overlaps the carcass ply 3 under the rubber lump 5, and expands along the side surface and upper surface of the rubber lump 5, and passes under the bead 1, and finally reaches above the bead 1 so that the bead 1 and the carcass ply 3 are not deviated from the bead sheet 7 area.

Figure 4:
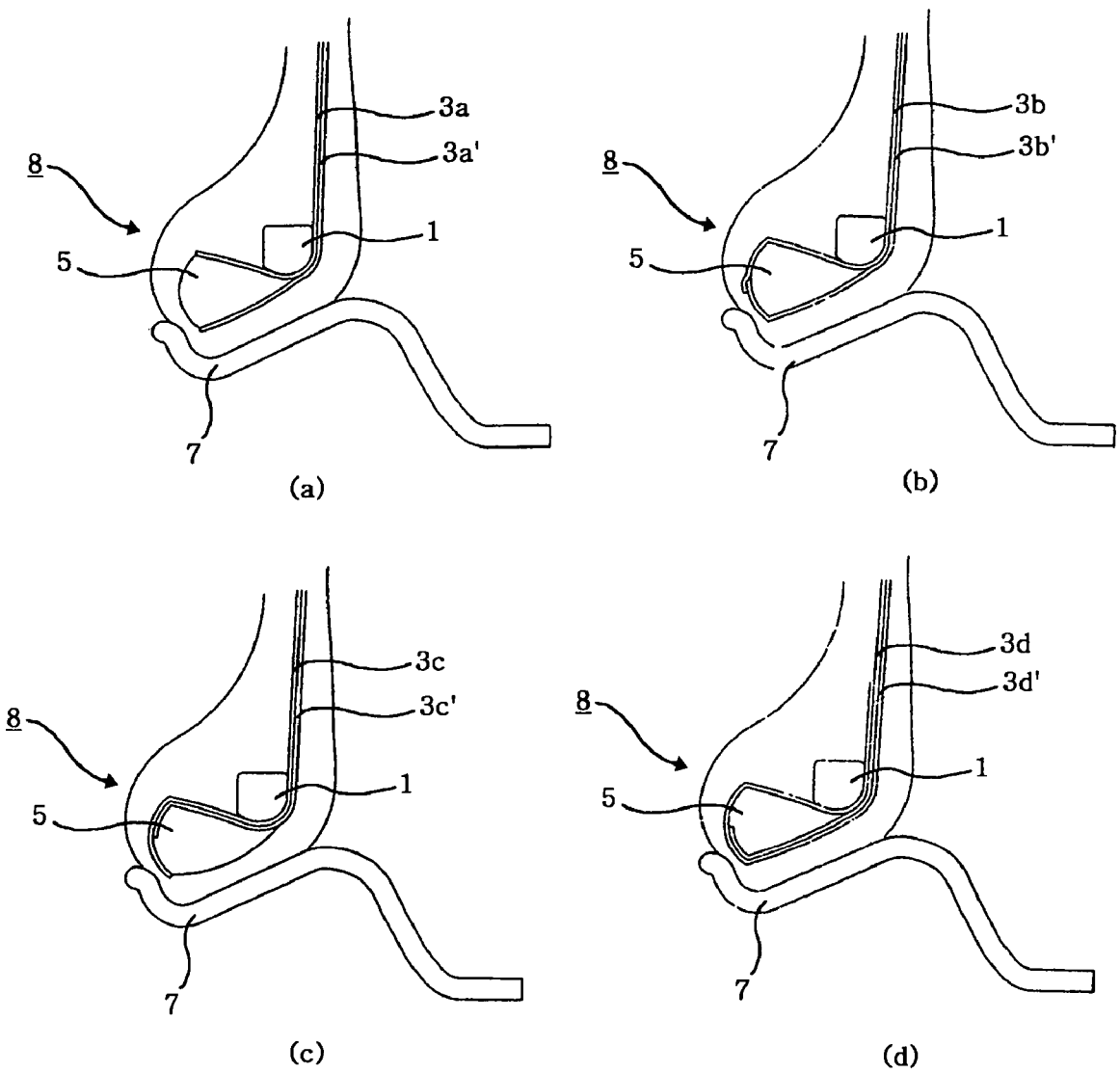
FIG. 4 is a sectional view illustrating various embodiments of the present invention, in which two sheets of carcass ply are installed, winding in various forms.

The figures (a), (b), (c) and (d) of FIG. 4 are cross-sectional views of the bead part of a tire illustrating other embodiments of the present invention, wherein two sheets of carcass ply wind in various form in each bead part.

While one sheet of the carcass ply is applied in the bead part of FIG. 2 and FIG. 3, respectively, two sheets of carcass ply are applied in the embodiments of FIG. 4, in FIG. 4(*a*) two carcass plies 3*a*, 3*a*' wind to upper and lower part of the rubber lump 5, in FIG. 4(*b*) two carcass plies 3*b*, 3*b*' wind to the upper and lower part of the rubber lump 5 and meet and overlap at the side of the rubber lump 5, in FIG. 4(*c*) two carcass plies 3*c*, 3*c*' wind the rubber lump 5 overlapping on the upper surface of the rubber lump 5, one carcass ply winding to the middle of the side surface of the rubber lump 5 and the other carcass ply overlapping said carcass ply and winding side surface of the rubber lump 5 completely, and in FIG. 4(*d*) two carcass plies 3*d*, 3*d*' wind the rubber lump 5, one carcass ply winding via lower surface of the rubber lump 5 to the middle of the side surface of the rubber lump 5 and the other carcass ply overlapping said carcass ply and winding the rubber lump 5 completely

INDUSTRIAL APPLICABILITY

By using the pneumatic tire with reinforced bead part of the present invention in a tire without a flange, the bead part is not easily released from the rim when the tire is deflated or under-inflated while driving, and the function of the tire is not affected. Therefore, car accidents caused by released bead part can be prevented.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A pneumatic tire with a reinforced bead part, said bead part including a bead having an upper side and a lower side, a rubber lump having an upper surface, a side surface, and a lower surface, a carcass ply, and a flipper, wherein the rubber lump is installed below the lower side of the bead and the carcass ply is wound around the lower surface of the rubber lump, and the flipper overlaps the carcass ply on the lower surface of the rubber lump, and is wound around the side surface and the upper surface of the rubber lump, the lower side of the bead, and the upper side of the bead.

2. A pneumatic tire with a reinforced bead part having a bead, said beat part including a bead having an upper side and a lower side, a rubber lump having an upper surface, a side surface and a lower surface, the rubber lump being installed below the lower side of the bead, said tire comprising two sheets of carcass ply, wherein one carcass ply is wound around an upper surface of the rubber lump, and the other carcass ply is wound around a lower surface of the rubber lump, and two carcass plies meet at a side surface of the rubber lump and overlap, the overlapping plies partially wrap around the bead.

3. A pneumatic tire having a reinforced bead part according to claim 2, wherein the rubber lump has a shore hardness between 95 and 100.

4. A pneumatic tire with a reinforced bead part having a bead, said bead part including a bead having an upper side and a lower side, a rubber lump having an upper surface, a side surface and a lower surface, the rubber lump being installed below the lower side of the bead, said tire comprising two sheets of carcass ply, one carcass ply being wound to the middle of a side surface of the rubber lump and passing through a lower end and an upper end of the bead, and the other carcass ply being wound completely around the side surface of the rubber lump, and overlapping the one carcass ply on the side surface of the lump.

5. A pneumatic tire with a reinforced bead part according to claim 4, wherein the rubber lump has a shore hardness between 95 and 100.

6. A pneumatic tire with a reinforced bead part having a bead, said bead part including a bead having an upper side and a lower side, a rubber lump having an upper surface, a side surface and a lower surface, the rubber lump being installed below the lower side of the bead, said tire comprising two sheets of carcass ply, one carcass ply is wound around the middle of a side surface of the rubber lump and a lower surface of the rubber lump, and the other carcass ply overlapping the one carcass ply and is wound completely around the rubber lump.

7. A pneumatic tire having a reinforced bead part according to claim 6, wherein the rubber lump has a shore hardness between 95 and 100.

* * * * *